United States Patent
Rückert et al.

[11] Patent Number: 6,019,424
[45] Date of Patent: Feb. 1, 2000

[54] HEADREST, IN PARTICULAR IN MOTOR VEHICLES

[75] Inventors: Edvard Rückert, Velbert; Norbert Krüger, Essen, both of Germany

[73] Assignee: Ewald Witte GmbH & Co. KG, Velbert, Germany

[21] Appl. No.: 09/204,098

[22] Filed: Dec. 1, 1998

[30] Foreign Application Priority Data

Dec. 3, 1997 [DE] Germany ............................ 197 53 540

[51] Int. Cl.[7] .................................................... B60N 2/42
[52] U.S. Cl. .............................. 297/216.12; 297/216.13; 297/216.14; 297/408
[58] Field of Search ......................... 297/216.12, 216.13, 297/216.14, 408

[56] References Cited

U.S. PATENT DOCUMENTS

| | | |
|---|---|---|
| 3,838,870 | 10/1974 | Hug . |
| 5,378,043 | 1/1995 | Viano et al. ...................... 297/216.12 |
| 5,884,968 | 3/1999 | Massara .............................. 297/216.12 |

FOREIGN PATENT DOCUMENTS

| | | |
|---|---|---|
| 0627340 | 12/1994 | European Pat. Off. . |
| 2232726 | 1/1974 | Germany . |
| 49-25690 | 2/1974 | Japan ................................ 297/216.14 |
| 7-291005 | 7/1995 | Japan ................................ 297/216.14 |

Primary Examiner—Peter M. Cuomo
Assistant Examiner—Anthony D. Barfield
Attorney, Agent, or Firm—Martin A. Farber

[57] ABSTRACT

A headrest (23) which pivots forward, by lever action, as a result of the mass of the upper body of a vehicle occupant acting on a pressure-bearing surface in the event of an impact from the rear. In order that in case of both a rear-end crash and a head-on crash of the vehicle, the headrest (23) follows the head of an individual sitting on the vehicle seat, the headrest (23) is positioned on a headrest carrier (17) which can be pivoted out of the backrest (3) in the forward direction and can be pivoted outward about a pin (19), this pin being located at a lower level than that of the pivot pin (21) of the headrest (23).

16 Claims, 9 Drawing Sheets

HEADREST, IN PARTICULAR IN MOTOR VEHICLES

FIELD AND BACKGROUND OF THE INVENTION

The invention relates to a headrest: which pivots forward, by lever action, as a result of a mass of the upper body of a vehicle occupant acting on a pressure-bearing surface in the event of an impact from the rear.

A headrest of this type is known from EP 0 627 340 B1, the backrest containing a U-shaped frame such that the U-web runs within the backrest, beneath the top edge thereof. The U-web forms a pivot bearing there for a double-armed headrest carrier. The top lever arm bears the headrest, while the bottom lever arm constitutes the pressure-bearing surface which, in the event of a rear-end crash of the vehicle, is subjected to loading as a result of the mass inertia of an individual sitting on the seat, this going hand in hand with the headrest carrier pivoting and the headrest moving in the direction of the back of the vehicle occupant's head. On the other hand, this configuration is of no use in the event of a head-on crash of the vehicle. This is because there is no follow-on movement of the headrest.

SUMMARY OF THE INVENTION

It is an object of the invention to provide a headrest of the above-mentioned type such that, in the case of both a rear-end crash and a head-on crash, it follows the head of the vehicle occupant sitting on the seat.

Accordingly the invention provideds a headrest wherein the headrest is positioned on a headrest carrier which can be pivoted out of the backrest of the seat in the forward direction and can be pivoted outward about a pin, this pin being located at a lower level than the pivot pin of the headrest.

A configuration of this kind gives a headrest of the generic type with an increased safety value. In contrast to the known configuration, the headrest acts not just in the event of a rear-end crash but also in the event of a head-on crash. This results from the arrangement of the pivot pin of the headrest in relation to that of the pin of the headrest carrier. The pressure-bearing surface extends between these two. In the event of a head-on crash, the headrest carrier is displaced forward about its pin, which is located at a lower level than the pivot pin of the headrest, this going hand in hand with the headrest being displaced forward in the direction of the back of the head of the individual sitting on the vehicle seat. If, on the other hand, a rear-end crash takes place, that is to say an impact from the rear, then, as a result of the mass inertia, the pressure-bearing surface has the back of the individual sitting on the vehicle seat acting on it, whereupon the headrest executes a displacement, about its pivot pin, in the direction of the back of the head. One version according to the invention is distinguished in that the pressure-bearing surface acts on a transmission lever which is articulated on the fixed part of the backrest and acts, in particular via a link, on a headrest-carrying arm, which can be pivoted about a pivot pin assigned to the headrest carrier. This means that, in the event of a rear-end crash, the transmission lever is pivoted via the pressure-bearing surface, said lever, for its part, pivoting, via the link, the headrest-carrying arm, which is articulated on the headrest carrier, and thus the headrest. In order to achieve a favorable lever action, the articulation point of the transmission lever is arranged approximately level with the pivot pin of the headrest carrier. Another advantageous configuration provides that the headrest-carrier pin, which is arranged in the bottom end section of the headrest carrier, can yield rearward counter to spring force, it being possible for the headrest carrier to be pivoted about a rocker-type rest arranged above the pin. In the event of a head-on crash, accordingly, the headrest carrier can move forward about its pin, the headrest being carried along at the same time. A rear-end crash, on the other hand, causes the headrest carrier to pivot about the rocker-type rest and thus likewise the headrest to advance up to the back of the head of the individual sitting on the vehicles seat. Pivoting about the rocker-type rest in this case is possible as a result of the headrest-carrier pin, which can yield rearward counter to spring force. In order that the headrest covers a relatively long distance upon pivoting of the headrest carrier, the invention provides that, as a result of a link mechanism, the headrest is displaced forward relative to the headrest carrier when the headrest carrier is pivoted outward. In this case, the relevant articulation point of the transmission lever extends to the rear of the headrest-carrier pivot pin. It is then provided that the headrest carrier can be pivoted out in the forward direction as a result of belt tensioning and pivoted back with damped-movement action. This is the case in the event of a head-on crash of the vehicle, the belt being tensioned by way of the individual sitting on the vehicle seat. Said belt tensioning is utilized in order to permit the headrest carrier to be pivoted outwards, it being possible, in order to reduce a whiplash action of the individual sitting on the vehicle seat, for said headrest carrier to be pivoted back with damped-movement action. The headrest carrier can then be displaced forwards by the belt itself, to be precise via a corresponding clamping device which comes into operation when the headrest carrier is displaced forward. However, it is also possible for the forward displacement of the headrest carrier to be brought about by the release of energy, be this by way of an energy store or pyrotechnic means. Furthermore, one advantageous feature consists in that the rocker-type rest is arranged in the central or top region of the headrest carrier. Finally, it is also advantageous according to the invention for the pin of the headrest carrier to be mounted in a slot of the fixed backrest part such that it can yield rearward.

BRIEF DESCRIPTION OF THE DRAWINGS

With the above and other objects and other advantages in view, the present invention will become more clearly understood in connection with the detailed description of the preferred embodiments, when considered with the accompanying drawings of which.

DETAILED DESCRIPTION OF THE PREFERRED EMBODIMENTS

Figure 1:
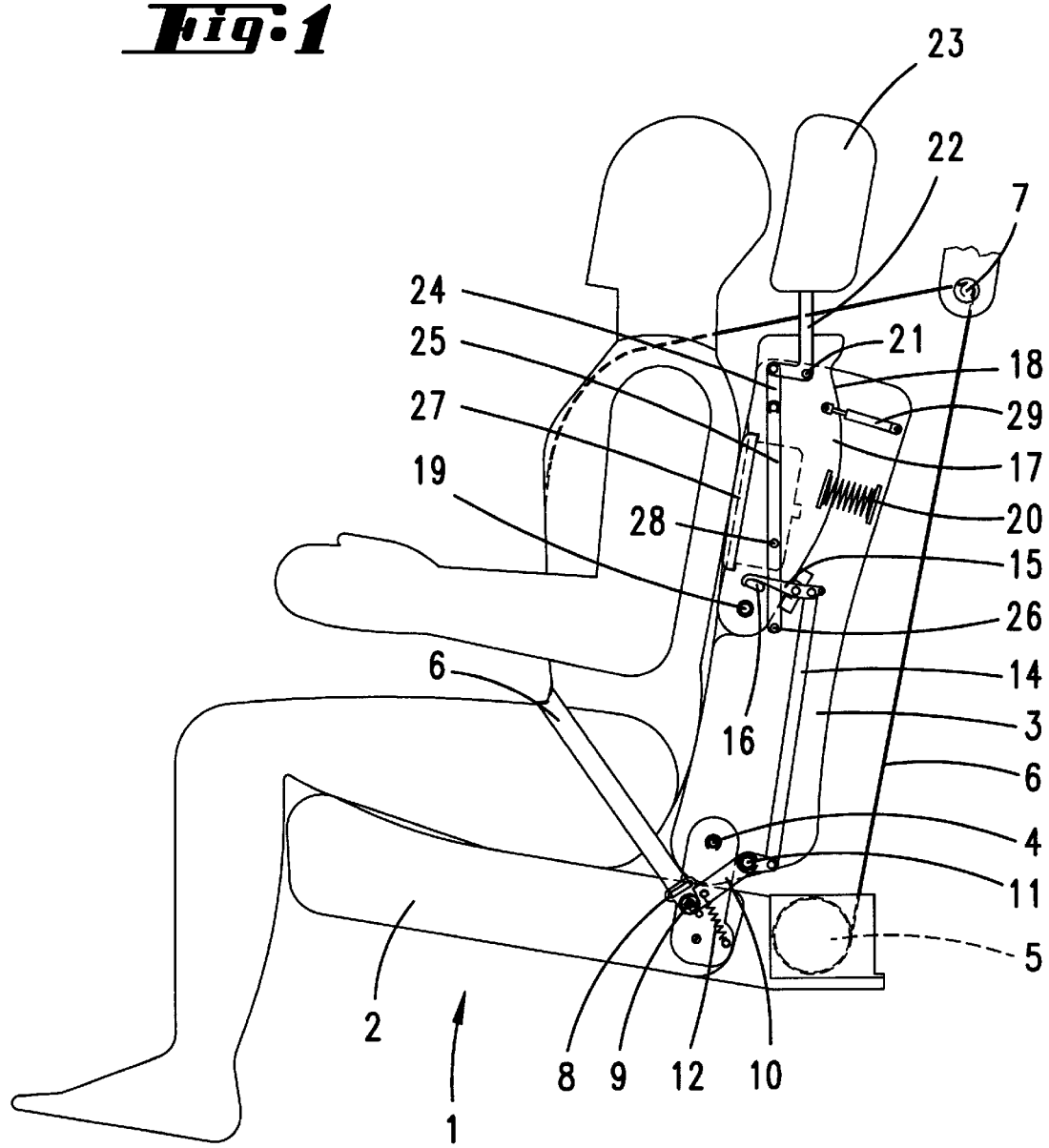
FIG. 1 shows a schematic illustration of a side view of a vehicle seat with an individual sitting on it, this illustration depicting the basic position and the first embodiment.

The vehicle seat illustrated in the exemplary embodiment is a front seat 1. The latter has the seat cushion 2, which forms a seat surface, and a backrest; 3 which is associated with said seat cushion and is arranged such that it can be pivoted about a seat-frame-side backrest pin 4. Located in the region of the B-pillar (not depicted) is a safety-belt supply reel 5, from which the safety belt 6 is drawn off. Said safety belt leaves the region of the B-pillar via a belt-deflection point 7 and, from there, winds around the upper body of the individual sitting on the vehicle seat. The end of the belt bears an insertion tab 8, which acts on a fastening point 9 of the vehicle seat 1 in a known manner. In this exemplary embodiment, the fastening point 9 is located on the longer arm of an angle lever 10 which can be pivoted, on the seat frame, about the articulation pin 11. A tension spring 12 forces the angle lever 11, in the counter clockwise direction, against a stop pin 13 of the seat frame such that the angle lever 10 only pivots in the clockwise direction when a specific belt-loading value has been exceeded.

The shorter arm of the angle lever 10 acts on a link 14 which, for its part is coupled in an articulated manner to a hook 15. Said hook is mounted on the fixed part of the backrest 3. The hook 15 forms a hook end 15' for interaction with a disengagement protrusion 16 of a headrest carrier 17. For the latter, the backrest 3 forms, in the top region, a shaft 18 which is open to the front and to the top, such that the headrest carrier 17, by way of its front side, terminates approximately flush with the backrest surface. As can be seen from the drawings, the headrest carrier 17 extends approximately over half the length of the backrest 3. In the bottom region, the headrest carrier 17 is mounted about a pin 19 such that the headrest carrier 17 can be pivoted out in a forward direction once it has been released by the hook 15. Pivoting outward is caused by the release of energy. For this purpose, the backrest 3 may contain a stored-energy spring 20 (which is schematically indicated). However, it is also possible for the headrest carrier 17 to be displaced forward by pyrotechnic means.

If the invention is executed for a rear seat, the safety-belt lead-through is provided in the backrest itself. In this case, the headrest carrier is preferably carried along via a clamping device. This means that, when the belt is subjected to tensile loading, the clamping device comes into operation and thus displaces the headrest carrier forward.

In the top region, the headrest carrier 17 receives a headrest pivot pin 21, about which an angled headrest-carrying arm 22 can be pivoted. The longer arm 22' of the headrest-carrying arm 22 bears the headrest 23, while a short link 24 acts on the shorter arm 22". Said link is connected in an articulated manner to a transmission lever 25 which, for its part, is articulated on the fixed part of the backrest 3. In this case, the articulation point 26 of the transmission lever 25 is arranged approximately level with the pin 19 of the headrest carrier 17. The articulation point 26 then extends to the rear of the headrest-carrier pin 19.

Located in the region between the headrest-carrier pin 19 and the pivot pin 21 of the headrest 23 is a pressure-bearing surface 27 which is guided in the headrest carrier 17, transversely with respect to the extent of the latter, and is directed towards the back of the individual sitting on the vehicle seat. This pressure-bearing surface 27 is in operative connection with the transmission lever 25 via a coupling member 28.

Figure 2:
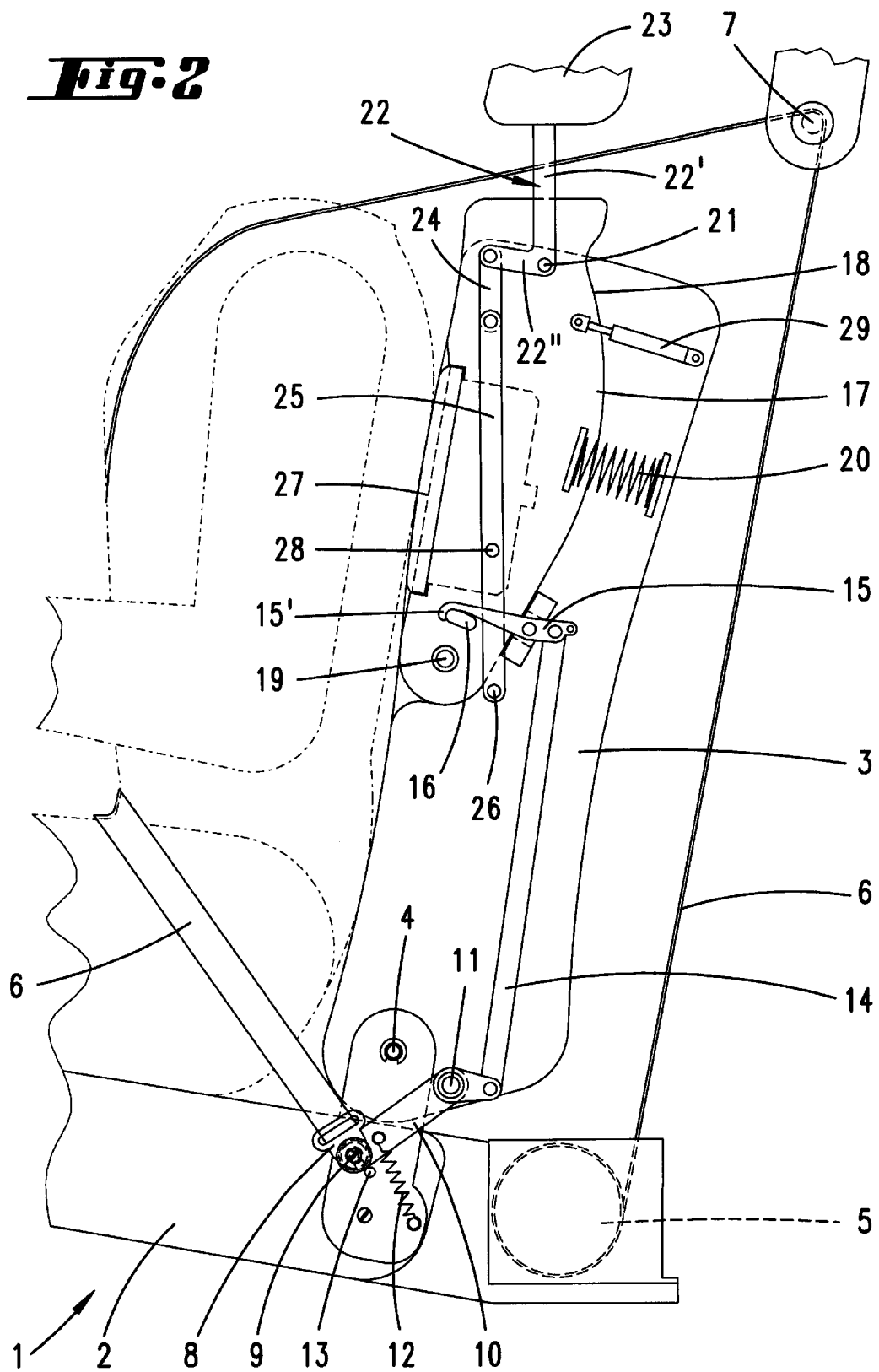
FIG. 2 shows an enlargement taken from FIG. 1.

This embodiment of the invention functions as follows:

In the event of a head-on crash of the vehicle equipped with the vehicle seat according to the invention, the individual sitting on the vehicle seat is flung forward as a result of his/her innate kinetic energy. This results in belt tensioning, see FIG. 2, together with pivoting of the angle lever 10, which, via the link 14 coupled to it, moves the hook 15 into the release position with respect to the disengagement protrusion 16. This releases the stored spring-energy of the spring 20, which for its part displaces the headrest carrier 17 forward. Together with this operation, the headrest 23 is also pivoted forward, via the link mechanism 22, 24, 25, such that the headrest 23 is displaced forward relative to the headrest carrier 17 when the latter is pivoted outward. In order to keep the whiplash effect small in the event of a head-on crash, the headrest carrier 17 is associated with a damping member 29 which, for its part, is supported on the fixed part of the backrest 3. Accordingly, rearward displacement of the headrest carrier 17 only takes place with damping action.

Figure 3:
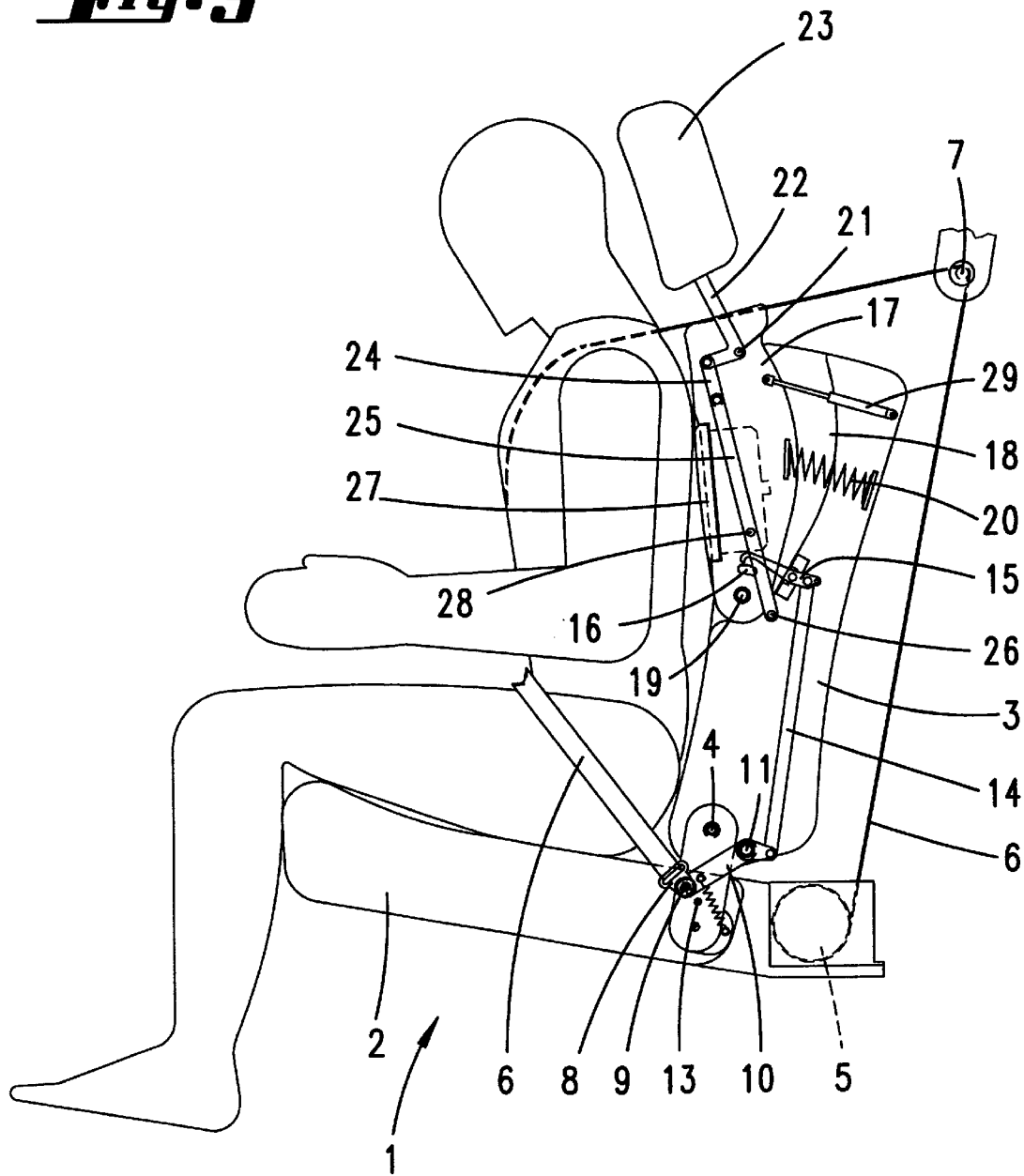
FIG. 3 shows an illustration like that in FIG. 1, but in the event of a head-on crash of the vehicle containing the vehicle seat.
Figure 4:
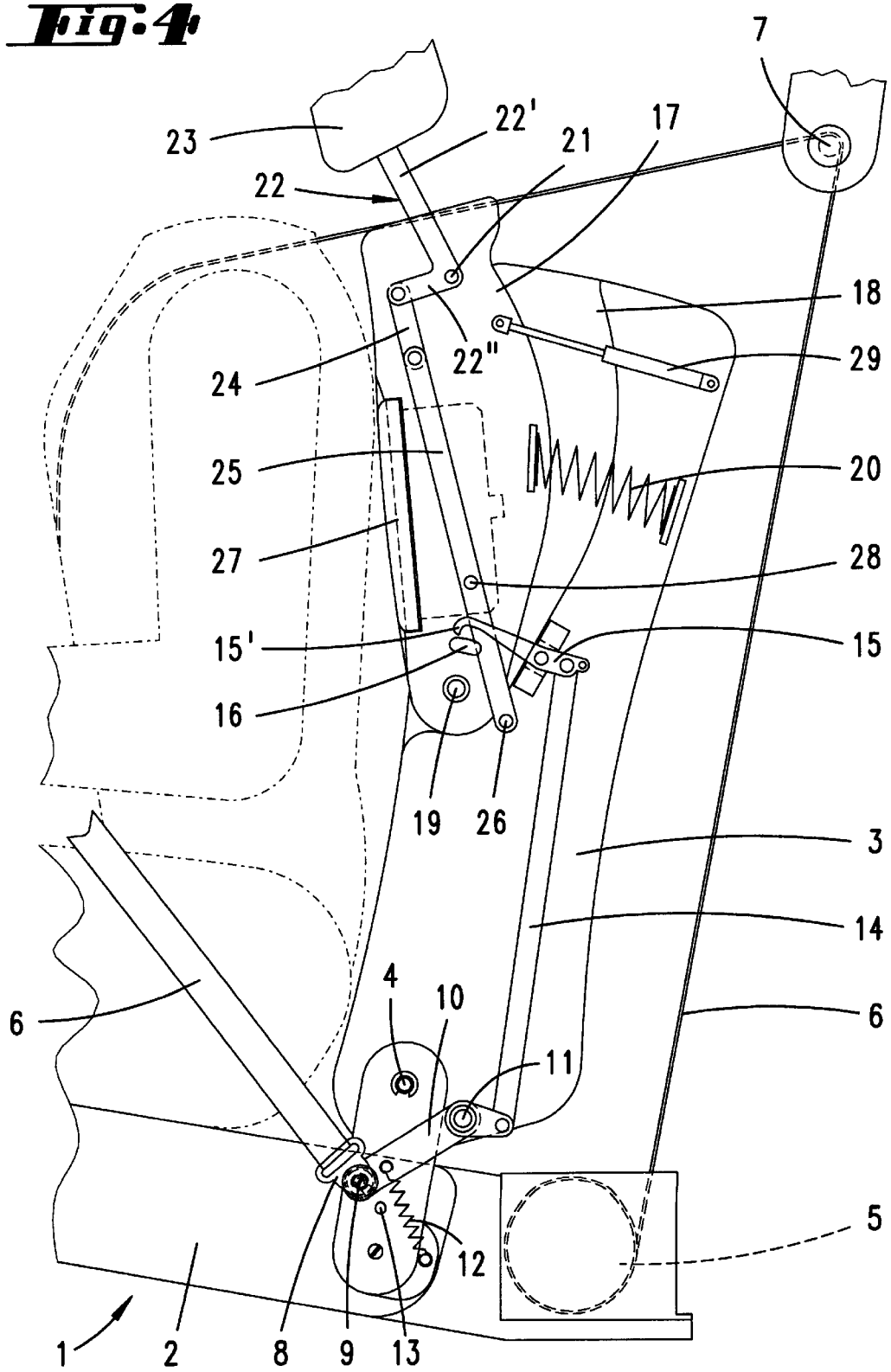
FIG. 4 shows an enlargement taken from FIG. 3.
Figure 5:
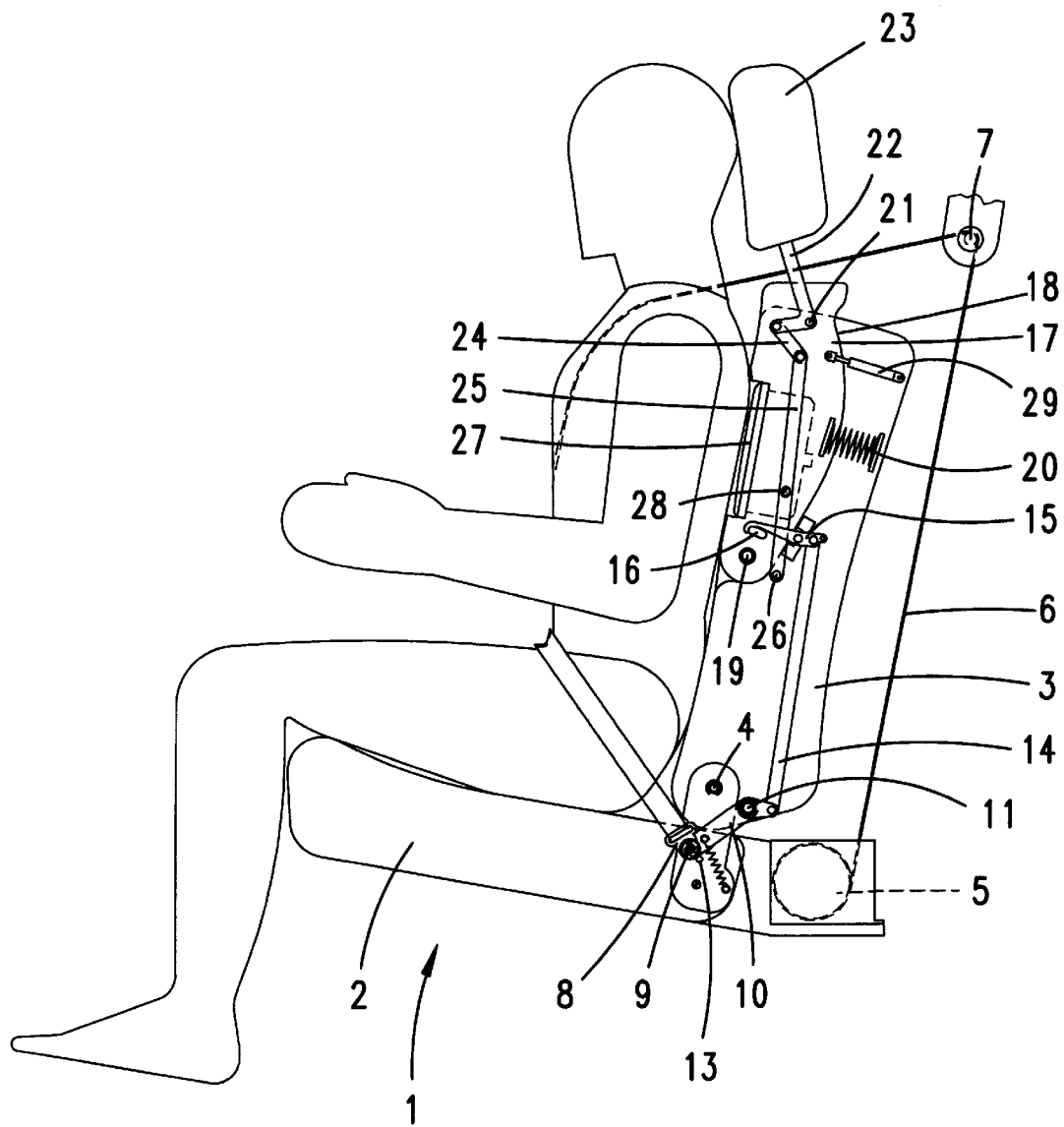
FIG. 5 shows an illustration like that in FIG. 1, but in the event of a rear-end crash.
Figure 6:
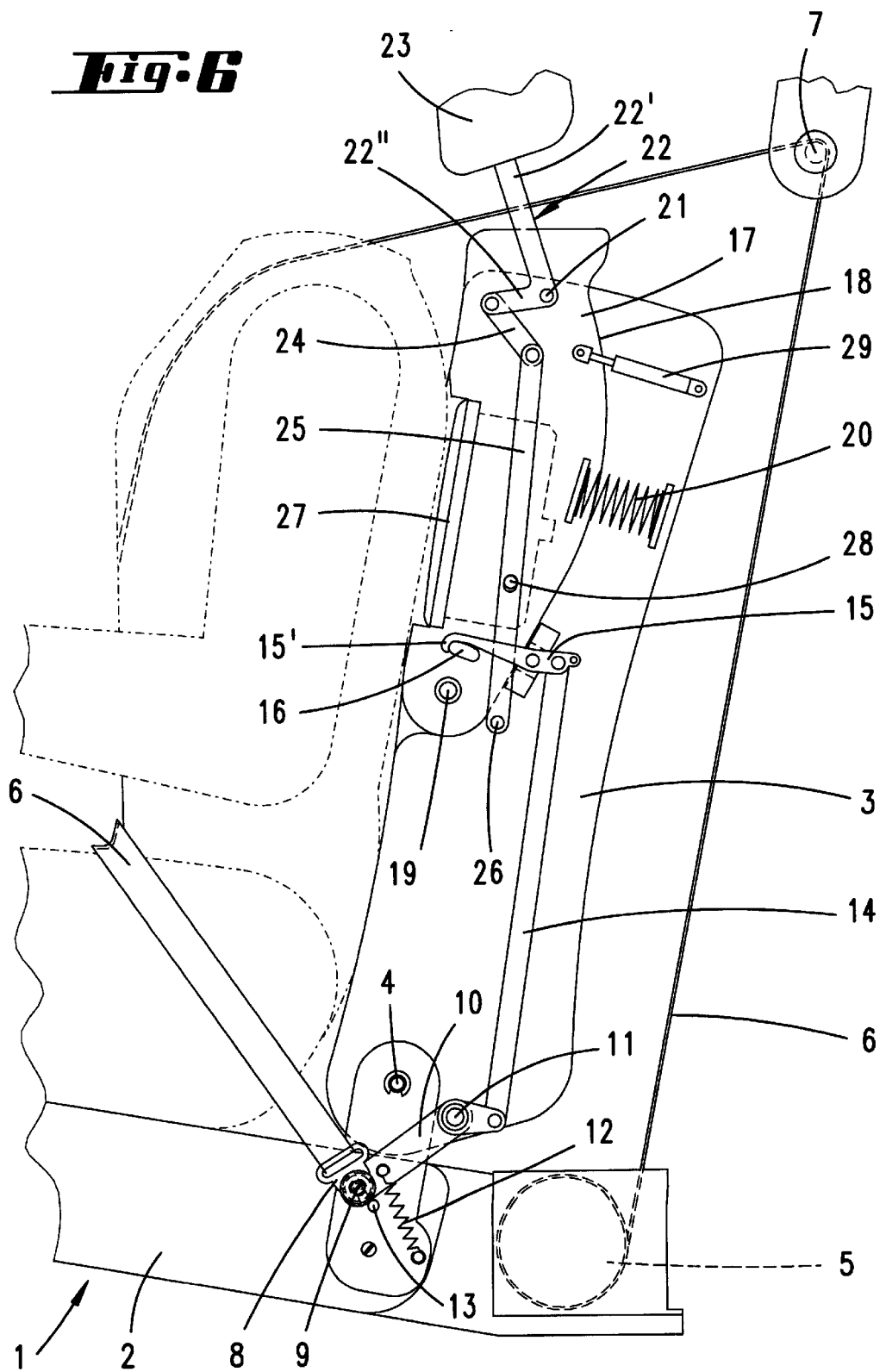
FIG. 6 shows the associated enlargement taken from FIG. 5.

In the event of a rear-end crash, on the other hand, the pressure-bearing surface 27 has the vehicle occupant's back acting on it. The inward displacement, directed into the backrest 3, of said pressure-bearing surface results in the transmission lever 25 pivoting, this going hand in hand with the headrest 23 likewise being displaced forward, cf. FIGS. 3 and 4. In this case, the spring-energy store is not disengaged since belt tensioning does not occur.

Figure 7:
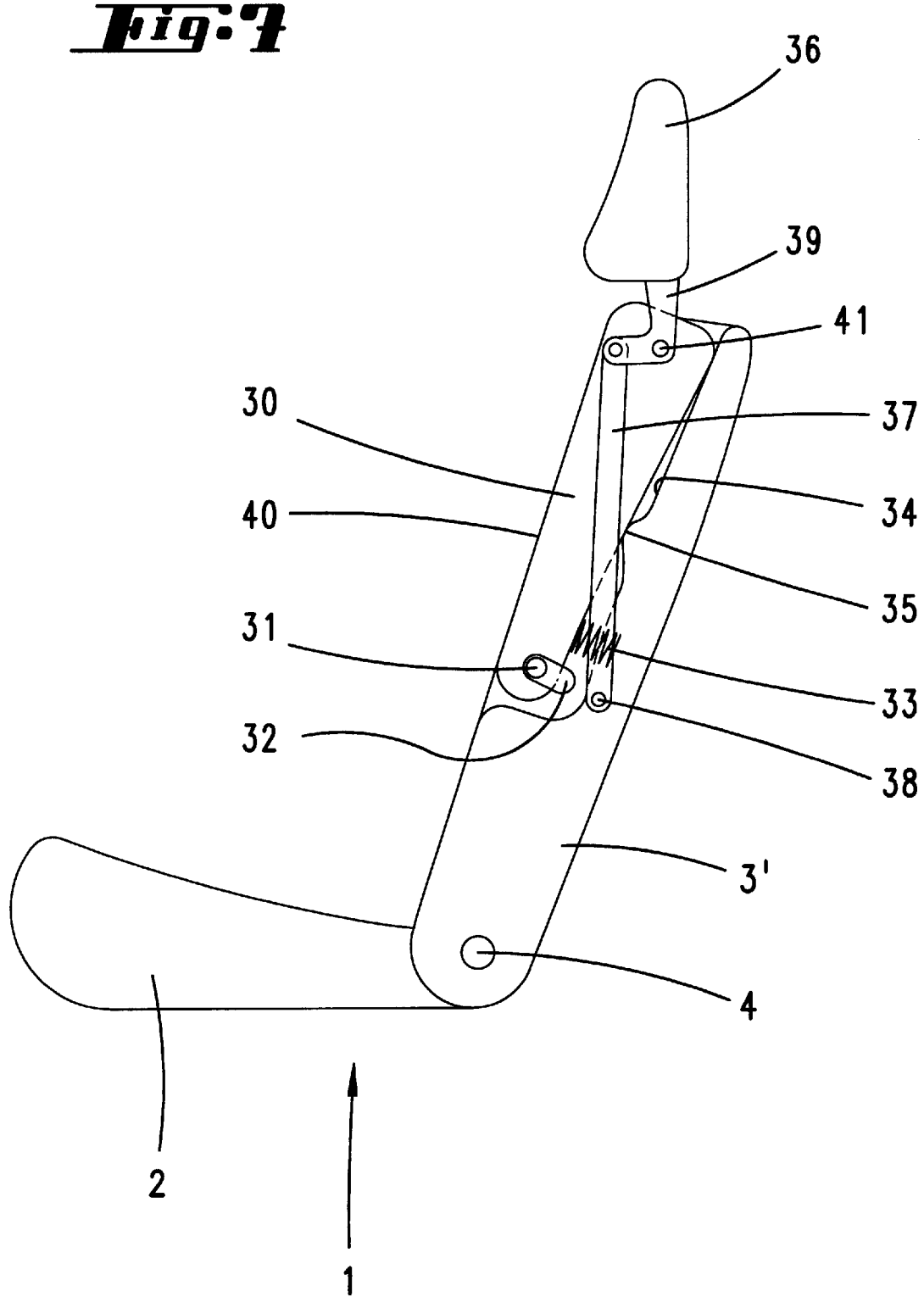
FIG. 7 shows a schematic side view of the second embodiment of the vehicle seat, with the vehicle seat and headrest being in the basic position.
Figure 8:
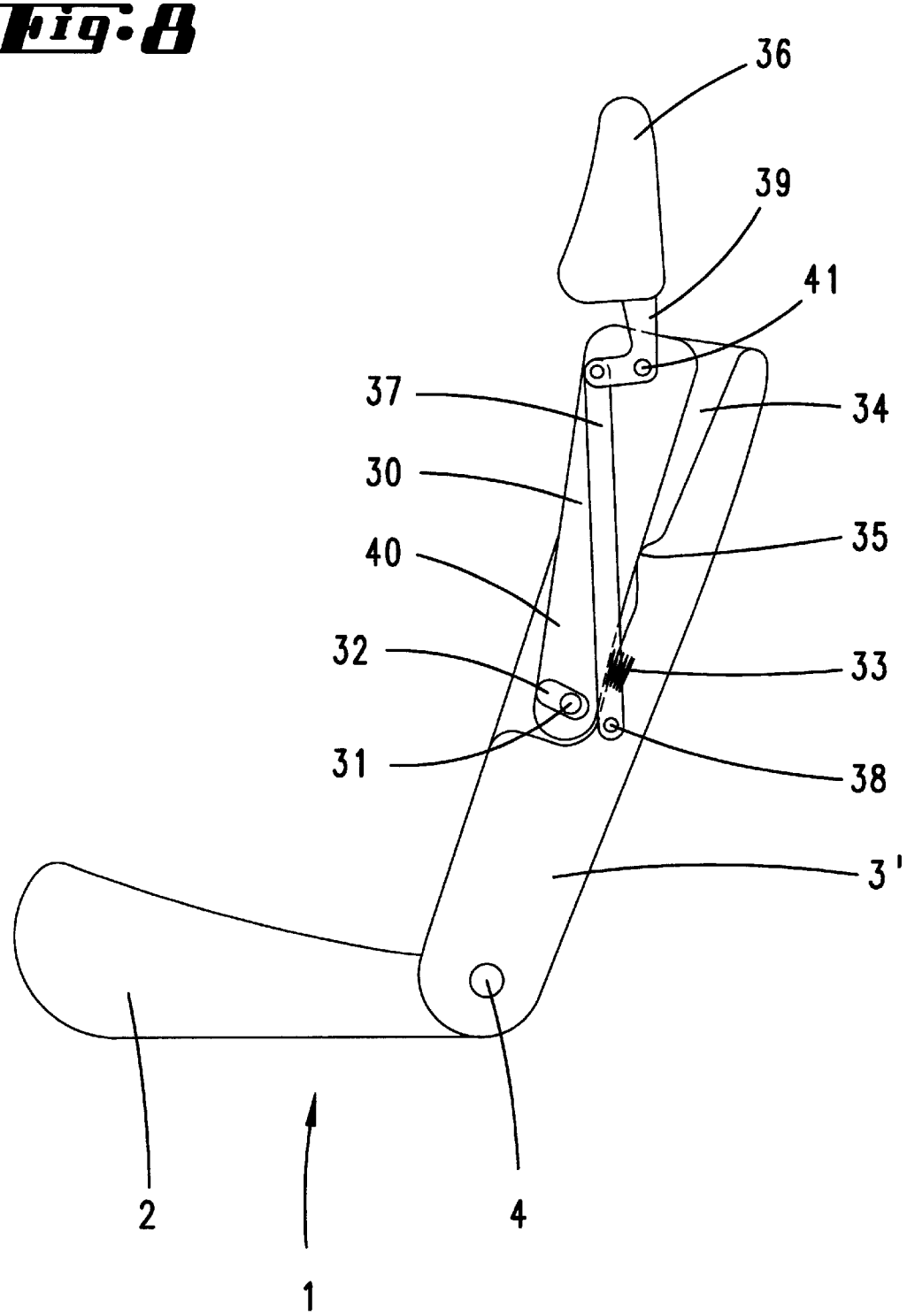
FIG. 8 shows the illustration which corresponds to FIG. 7, but depicting the position reached in the event of a head-on crash.
Figure 9:
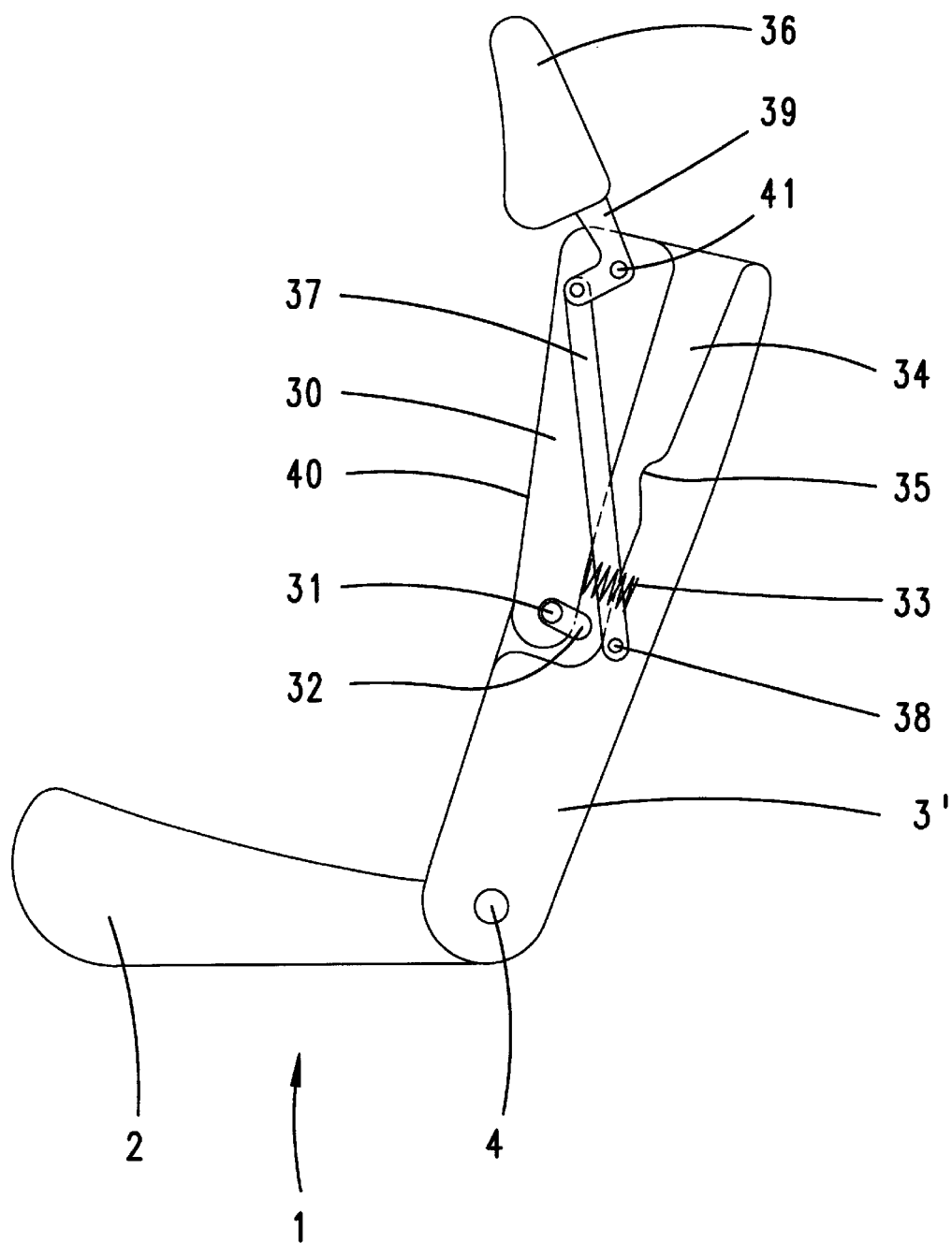
FIG. 9 shows the illustration which likewise corresponds to FIG. 7 but relates to the rear-end crash.

In the second embodiment, which is illustrated in FIGS. 7 to 9, the same components are given the same designations. Unlike the first embodiment, this pin 31, which is arranged in the bottom end section of the headrest carrier 30, can yield rearward counter to spring force. For this purpose, the pin 31 is mounted such that it can yield rearward in a slot 32 of the fixed backrest part. The spring action is provided by a compression spring 33 which is supported on the fixed backrest part, on the one hand, and on the headrest carrier 30, on the other hand. When the pin 31 has been displaced forward, the front surface of the headrest carrier 30 terminates flush with that of the backrest 3'. The shaft 34 of the backrest 3' said shaft forming the headrest carrier 30, forms, above the displaceable pin 31 a rocker-type rest 35 for the rearward support of the headrest carrier 30. This rocker-type rest 35 is arranged in the central region of the headrest carrier 30. However, it would also be possible for the rocker-type rest 35 to be provided in the top region of the headrest carrier.

Account is also taken in this embodiment of the fact that, as a result of a link mechanism, the headrest 36 is displaced forward relative to the headrest carrier 30 when the latter is pivoted outward. A transmission lever 37 is likewise provided for this purpose, its articulation point 38 being located to the rear of the headrest-carrier pin 31.

The transmission lever 37 leads to an angled headrest-carrying arm 39, of which the longer arm bears the headrest 36 and the shorter arm is coupled to the transmission lever 37. The carrying arm 39 is mounted about a headrest pivot pin 41 of the headrest carrier 30.

The second functions as follows:

In the event of the vehicle being subjected to frontal impact, the belt tensioning causes the headrest carrier 30 to be disengaged, as in the first. Said headrest carrier pivots forward, by spring action, into the position according to FIG. 8. Together with this, the headrest 36 is pivoted via the link mechanism 37, 39, with the result that it advances ahead of the outward-pivoting movement of the headrest carrier 30.

In the event of a rear-end crash on the other hand, the pressure-bearing surface 40 of the headrest carrier 30 has the back of the individual sitting on the vehicle seat acting on it, this pressure-bearing surface 40 being formed, then, by that region of the headrest carrier 30 which is located between the rocker-type rest 35 and pin 31. By virtue of being subjected to loading, the headrest carrier 30 pivots about the rocker-type rest 35, this going hand in hand with the headrest carrier 30 pivoting outward, it being possible for the pin 31 to yield rearward, counter to spring action, in the slot 32. Together with the outward-pivoting movement of the headrest carrier 30, the headrest 36 pivots outward as well. The link mechanism 37, 39 causes the headrest 36 to be displaced forward relative to the headrest carrier 30 when the latter is pivoted outward.

We claim:

1. A headrest mechanism comprising a headrest which pivots forward, by lever action, as a result of mass of an upper body of a vehicle occupant acting on a pressure-bearing surface upon a rear impact, a backrest, a headrest carrier, wherein the headrest is seated on said headrest carrier, said carrier being mounted pivotable out of the backrest in a forward direction and pivotable outward about a first pin, said pin being at a lower level than that of a pivot pin of the headrest, wherein the pressure-bearing surface is on the headrest carrier and acts on a transmission lever, said lever is articulated on a fixed part of the backrest, said lever acts, in particular via a link, on a headrest-carrying arm, said arm is pivotable about said pivot pin, said pivot pin being associated with the headrest carrier.

2. The headrest mechanism as claimed in claim 1, wherein an articulation point of the transmission lever on the fixed part of the backrest is arranged approximately level with the first pin of the headrest carrier.

3. The headrest mechanism as claimed in claim 1, wherein the first pin is arranged in a bottom end section of the headrest carrier and is yieldable in a slot in said backrest rearward counter to a spring force, the headrest carrier is pivotable about a rocker-type rest, and said rocker-type rest is arranged above the first pin.

4. The headrest mechanism as claimed in claim 3, wherein, the rocker-type rest is arranged in a central region of the headrest carrier.

5. The headrest mechanism as claimed in claim 4, wherein the first pin of the headrest carrier is mounted in said slot of the fixed part of said backrest such that said first pin is yieldable rearwardly.

6. The headrest mechanism as claimed in claim 3, wherein, the rocker-type rest is arranged in a top region of the headrest carrier.

7. The headrest mechanism as claimed in claim 6, wherein the first pin of the headrest carrier is mounted in said slot of the fixed part of said backrest such that said first pin is yieldable rearwardly.

8. The headrest mechanism as claimed in claim 1, further comprising a link mechanism including said link, and wherein the headrest is displaced forward relative to the headrest carrier via said link mechanism when the headrest carrier is pivoted outward.

9. The headrest mechanism as claimed in claim 8, wherein, said link mechanism includes a transmission lever, and an articulation point of the transmission lever is located to a rear of the first pin of the headrest carrier.

10. The headrest mechanism as claimed in claim 1, wherein, the headrest carrier is carried along by a seat belt operatively connected to the headrest carrier.

11. The headrest mechanism as claimed in claim 1, wherein, the headrest carrier is pivotally displaceable forwardly upon a release of energy.

12. A headrest mechanism comprising a headrest which pivots forward, by lever action, as a result of mass of an upper body of a vehicle occupant acting on a pressure-bearing surface upon a rear impact, a backrest, a headrest carrier, wherein the headrest is seated on said headrest carrier, said carrier being mounted pivotable out of the backrest in a forward direction and pivotable outward about a first pin, said pin being at a lower level than that of a pivot pin of the headrest, wherein, the headrest carrier is pivotable out in the forward direction upon a seat belt tensioning and is pivotable back with damped-movement action via a damper.

13. A vehicle seat comprising a backrest, and a headrest, the backrest having a headrest carrier, said headrest carrier being pivotable-out forwardly with respect to the backrest about a first pivot, a carrying arm carrying the headrest, said carrying arm being mounted pivotable forwardly with respect to the headrest carrier about a second pivot, said second pivot is seated on the headrest carrier and is located above the first pivot of the headrest carrier, and a linkage engaging said carrying arm such that, upon a pivoting-out movement of the headrest carrier, the headrest is displaced forwardly relative to the headrest carrier.

14. The vehicle seat as claimed in claim 13, wherein said linkage comprises a transmission lever coupled to said headrest carrier and a link connecting said transmission lever to said carrying arm.

15. A vehicle seat comprising a backrest having a pressure surface, a headrest being operatively mounted on the backrest so as to pivot forwardly by lever action under load of a mass of an upper body of a vehicle occupant on the pressure surface upon an impact acting from the rear, wherein a transmission lever is operatively connected to the pressure surface, enabling the latter to act on the transmission lever, said transmission lever being articulated on the backrest below the pressure surface, and a headrest carrying arm carrying the headrest, said transmission lever acting on said headrest carrying arm, said carrying arm being pivotable about a pivot, said pivot being arranged in the backrest above the pressure surface.

16. The vehicle seat as claimed in claim 15, further comprising a link connecting said transmission lever to said headrest carrying arm, said transmission lever acting on said headrest carrying arm via said link.

* * * * *